US011624802B2

(12) United States Patent
Lev

(10) Patent No.: US 11,624,802 B2
(45) Date of Patent: Apr. 11, 2023

(54) AUGMENTING TRACKING BASED ON BEACON SIGNAL USING ORIENTATION AND OBSTRUCTION ANALYSIS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 183 days.

(21) Appl. No.: 17/175,674

(22) Filed: Feb. 14, 2021

(65) Prior Publication Data

US 2022/0260667 A1    Aug. 18, 2022

(51) Int. Cl.
*G01S 5/02* (2010.01)
*G06T 19/00* (2011.01)
*H04W 16/20* (2009.01)

(52) U.S. Cl.
CPC .......... *G01S 5/0284* (2013.01); *G06T 19/003* (2013.01); *H04W 16/20* (2013.01)

(58) Field of Classification Search
CPC ..... G06T 19/003; G01S 5/0284; H04W 16/20
See application file for complete search history.

(56) References Cited

U.S. PATENT DOCUMENTS

| 6,070,051 A * | 5/2000 | Astrom | H04B 7/18519 |
| | | | 455/12.1 |
| 2016/0323753 A1* | 11/2016 | Zhang | H04B 17/318 |
| 2018/0139623 A1* | 5/2018 | Park | H04B 17/3912 |
| 2022/0103271 A1* | 3/2022 | Wan | H04B 7/082 |

* cited by examiner

Primary Examiner — King Y Poon
Assistant Examiner — Vincent Peren

(57) ABSTRACT

Provided herein are methods and systems for generating a model, mapping a monitored space, and used for augmenting the location and paths of devices path in the monitored space, using orientation and obstruction analysis. The disclosure comprises moving a device having a camera and one or more wireless transceiver through the monitored space, exchanging signal transmissions with one or more wireless transceivers present in the monitored space, and taking images, video sequences, or other optical readings. Either the mobile wireless device, the wireless transceivers, or both may have a non-isotropic transmission and reception characteristics, due to antenna structure, occlusions, other objects with radiation impact and/or the like. The images, videos, and/or optical readings, in addition to the received signal characteristics are stored and processed to generate the model, which one or more verification units, configured to verify the location objects or devices in the monitored space, may use.

22 Claims, 8 Drawing Sheets

4 meter 310

8 meter 320

5 meter 330

AUGMENTING TRACKING BASED ON BEACON SIGNAL USING ORIENTATION AND OBSTRUCTION ANALYSIS

FIELD AND BACKGROUND OF THE INVENTION

The present invention, in some embodiments thereof, relates to generating a model, mapping a monitored space embodied with a plurality of wireless devices, and, more specifically, but not exclusively, to using a mobile device for acquiring data about objects with radiation impact and the plurality of wireless devices, as a part of the mapping of the monitored space.

Sensitive public locations, for example, office areas, buildings, facilities, schools, hospitals, sports stadiums, train stations, airports and/or the like may be, or comprise monitored spaces. The travel path of people therein may be highly indicative of covert intentions they may have. Authenticating users based on their physical location and/or travel paths within the may provide high benefit, particular in sensitive locations.

Moreover, monitoring location and path tracking may be further applied for tracking sanitation staff and/or disinfection apparatuses manually and/or automatically operated to disinfect public space, particularly in times of epidemic outbreaks such as the outbreak of the COVID-19 epidemic, when frequent and efficient disinfection and sanitization may be required.

Naïve mapping of the monitoring location, based on floorplans and designated location of fixed wireless devices, which may be referred to as beacons, may be imprecise due to variations between floorplans and the actual space build, and more importantly, presence of other objects with radiation impact.

SUMMARY OF THE INVENTION

It is an object of the present disclosure, in some embodiments thereof, to provide a system and a method for generating and augmenting a model, mapping a three dimensional space, using location data of a mobile device used for image capturing, wherein the images are used for detection of objects with radiation impact.

The mapping of the physical 3D space may be used to augment the radiation strength model for one or more tuples of given location and orientation within the space, for improved reliability, precision, robustness and the like.

The foregoing and other objects are achieved by the features of the independent claims. Further implementation forms are apparent from the dependent claims, the description and the figures.

According to some embodiments of the invention, there is provided a computer implemented method of generating and augmenting a model, comprising:
 receiving at least one image of a three dimensional space and a location data of a mobile device used for capturing the image while the image is taken;
 analyzing the at least one image to identify at least one placement characteristic of at least one of a plurality of objects with radiation impact in the three dimensional space;
 analyzing the at least one image to predict an effect of at least one of the plurality of objects with radiation impact on a plurality of expected signal characteristics in at least one location in the monitored three dimensional space; and
 generating a model mapping the plurality of expected signal characteristics of at least one beacon in the monitored three dimensional space.

According to some embodiments of the invention, there is provided a system for generating and augmenting a model, comprising:
 a mobile device used for capturing at least one image of a three dimensional space and a location data of the mobile device while the image is taken; and
 a computing system configured for:
  receiving the at least image from the mobile device;
  analyzing the at least one image to identify at least one placement characteristic of at least one of a plurality of objects with radiation impact in the three dimensional space;
  analyzing the at least one image to predict an effect of at least one of the plurality of objects with radiation impact on a plurality of expected signal characteristics in at least one location in the monitored three dimensional space; and
  generating a model mapping the plurality of expected signal characteristics of at least one beacon in the monitored three dimensional space.

Optionally, wherein the model is associated with a verifying a user path through the monitored space.

Optionally, wherein at least one of the plurality of expected signal characteristics is associated with a signal's strength.

Optionally, wherein the mobile device further comprising a wireless transceiver.

Optionally, wherein the mobile device further comprising an additional wireless transceiver, the at least one of the plurality of expected signal characteristics is associated with the difference between a signal's strength at the wireless transceiver and the signal's strength at the additional wireless transceiver.

Optionally, wherein the mobile device further comprising an additional wireless transceiver, the at least one of the plurality of expected signal characteristics is associated with the difference between a signal's phase at the wireless transceiver and the signal's phase at the additional wireless transceiver.

Optionally, wherein the plurality of objects with radiation impact comprises a plurality of beacons.

Optionally, wherein the plurality of objects with radiation impact comprises at least one radiation diverting object.

Optionally, wherein the at least one radiation diverting object comprises a reflective surface.

Optionally, wherein the at least one radiation diverting object comprises a radiation absorbing object.

Optionally, wherein at least one beacon of the plurality of beacons is placed on a moveable object.

Optionally, wherein the effect of the at least one of the plurality of objects with radiation impact is an effect of the at least one radiation diverting object on a plurality of expected signal characteristics of the at least one beacons.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 8A:
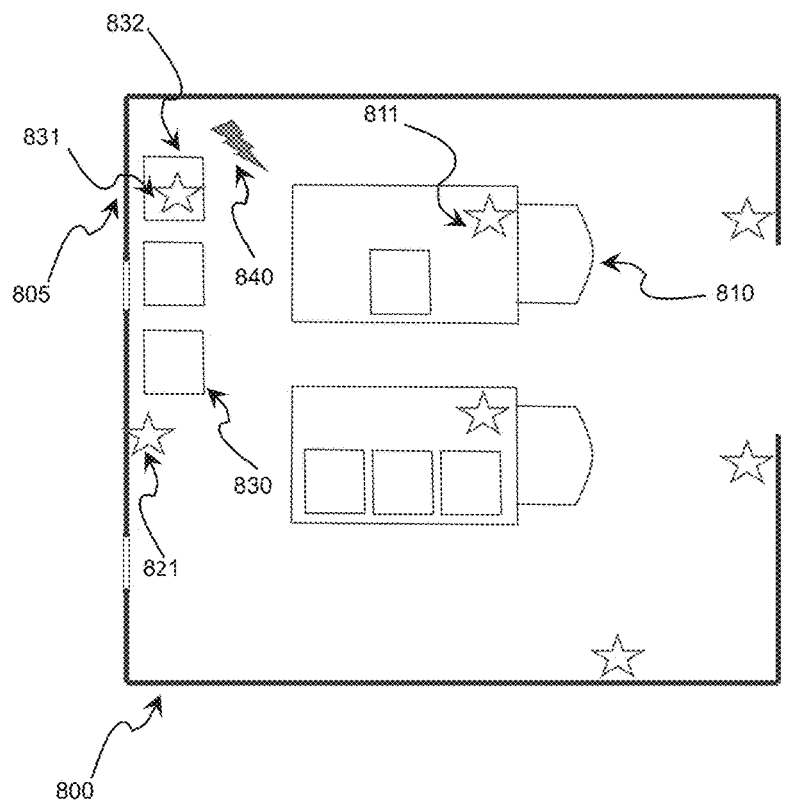
Figure 8B:
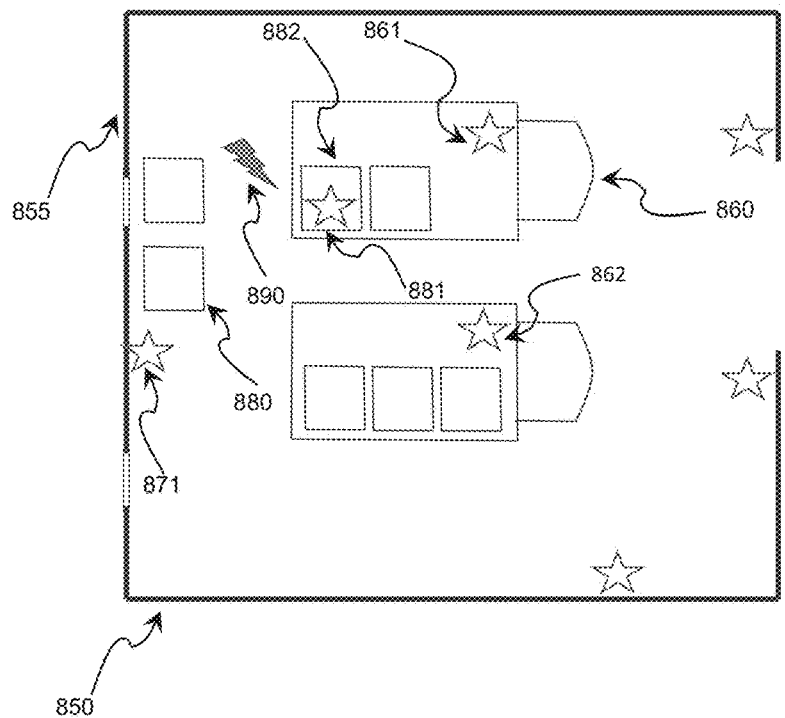

FIG. 8A shows some exemplary aspects of a model mapping exemplary expected signal characteristics over a floorplan of another exemplary monitored space, wherein the plurality of objects with radiation impact comprises stationary and non-stationary beacons and radiation diverting object, according to some embodiments of the present invention; and FIG. 8B shows some exemplary aspects of a model mapping exemplary expected signal characteristics over a floorplan of another exemplary monitored space, wherein the plurality of objects with radiation impact comprises beacons and radiation diverting object, according to some embodiments of the present invention.

DESCRIPTION OF SPECIFIC EMBODIMENTS OF THE INVENTION

The present invention, in some embodiments thereof, relates to generating a model, mapping a monitored space embodied with a plurality of wireless devices, and, more specifically, but not exclusively, to using a mobile device for acquiring data about objects with radiation impact and the plurality of wireless devices, as a part of the mapping of the monitored space.

According to some embodiments of the present invention, there are provided methods, systems, devices and computer program products for generating a model, mapping a monitored space embodied with a plurality of wireless devices, by using a mobile device for acquiring data such as images about objects with radiation impact and the plurality of wireless devices.

The term radiation diverting objects in a monitored area is used herein to describe objects which may reflect radiation in the same manner a mirror reflects visible light, absorb the radiation similarly to black objects absorbing visible light, divert the radiation as a prisms or lens divert visible light, and/or the like. The radiation diverting objects may have a paramount effect on characteristics of signals, received from beacons, due to occlusion, multipath and the like.

The term objects with radiation impact is used herein to general object having influence of presence of electromagnetic radiation which may comprise frequencies relevant to the wireless devices which may traced and/or localized using the model. One example of objects with radiation impact is radiation diverting objects, such as objects comprising at least one reflective surface for at least some radiation frequencies, and radiation absorbing objects. Another example of objects with radiation impact is radiation producing objects, such as fixed devices having at least one electromagnetic transmitter or transceiver, including wireless network access points and localization devices which may also be referred to as beacons. The term objects with radiation impact may also refer to objects which may convert electromagnetic radiation from one frequency or another, for example by absorbing radiation and emitting radiation at given frequencies, or black body radiation, objects which may radiate due to chemiluminescence, and the like.

An exemplary effect of objects with radiation impact is an effect of radiation diverting object on expected signal characteristics of a beacons in one or more locations. The effect may reduce the signal strength, account for variance and different signal shape due to multipath, and/or the like. The effects may influence estimations such as the estimated distance of the beacon from a wireless device at the one or more locations.

The term placement characteristic may refer to location in space in various axes, as well as alignment or direction characteristics such as yaw, pitch, and roll, and/or spatial relations with one or more additional objects.

One or more mobile wireless devices, comprising sensors such as cameras, may be placed or moved in the monitored space, and capture images of objects with radiation impact. The objects may comprise fixed wireless devices, and other objects in the monitored space. Some objects present on the monitored space may divert, occlude, absorb, reflect and/or the like wireless transmissions. These objects may be referred to as radiation diverting objects.

The images may be captured using the light present in the monitored space, natural or artificial, or assisted with a light source attached to the mobile device. Taking images using fixed light condition, shutter speeds, and aperture size may ease matching of different images, for example for generating panoramic view. However, due to dynamic range limitation of many sensors, some details may be hard to detect.

Images may be taken using standard digital camera devices, single-lens reflex (SLR) cameras, red green blue depth (RGBD) sensors which also measure depth, and/or the like, however sensors such as infrared, ultraviolet, synthetic aperture radar (SAR), and sonar sensors may be used additionally or alternatively.

Followingly, images may be processed using algorithms such as image stitching and three dimensional (3D) reconstruction, optionally using gyro and location data associated with the images. The processing may apply a broad variety of computer vision algorithms based on gradient descent for pixel to pixel fitting, stereo vision, structure from motion, feature matching methods such as random sample consensus (RANSAC) based on local descriptors such as neural network based local descriptors, wavelets, histogram of gradients (HOG), scale-invariant feature transform (SIFT) and the like may be used to calibrate the matching between images, and extract 3D location of beacons and radiation diverting objects. Optionally, deep learning based methods, such as neural networks, may be used to extract locations of objects, for example region convolution neural networks (RCNN) and you only look once (YOLO), Single Shot MultiBox Detector (SSD), Region-Based Fully Convolutional Networks, and their derivatives.

The beacons are fixed location wireless devices, which may communicate with mobile wireless devices for the purpose of identification and location finding and calibration. The beacons may further comprise services such as network access, user information transmission, and/or the like.

The monitored space which may be a private area and/or a public area, for example, an office area, a building floor, a building, a facility, a school, a hospital, a sports stadium, a train station, an airport and/or the like may be deployed with plurality of wireless devices located in predefined, fixed locations in the monitored space. The wireless devices may be transmitters or transceivers, and may be configured to interact with other wireless devices via one or more wireless communication channels, for example, Radio Frequency (RF), Bluetooth (BT), Bluetooth Low Energy (BLE), ZigBee, Near Field Communication (NFC), Wireless Local Area Network (WLAN, e.g. Wi-Fi) and/or the like. Specifically, the wireless transceivers may be limited range transceivers having a limited transmission range, for example, 0.5 meter, 1 meter, 1.5 meter, 4 meters, 8 meters and/or the like and are thus cable of communicating only with wireless devices located within their limited transmission space (coverage area).

Optionally, one or more of the wireless transceivers may be battery-less wireless transceivers, for example, powered by solar energy or may capture energy from RF transmission originating from one or more other wireless devices located in their environment.

Optionally, the mobile wireless devices may communicate with one or more of the wireless transceivers, or beacons deployed in the monitored space over one or more wireless communication channels within range. For example, beacons and/or mobile wireless device may continuously or periodically transmit a device identification (ID) uniquely assigned to the respective wireless device. One or more of the wireless transceivers may receive device ID of the respective mobile wireless device and in response may exchange location information such as global positioning system (GPS) based location estimate, or a location certificate to the respective wireless device, using one or more predefined communication protocol. Optionally, one or more of the wireless transceivers may encrypt the location certificates they transmit according to one or more cryptographic protocols and/or algorithms using one or more secret cryptographic keys which are not available and thus unknown to the mobile wireless devices.

The mobile wireless device may transmit the images it acquired in the monitored space, optionally with readings about the location and viewing direction of the device to a system, which may also be used for extracting or estimating properties of objects with radiation impact in the monitored space. The system may further estimate of fine tune the location data of one or more of the objects with radiation impact, for example the beacons. Various algorithms may be used to convert the image data to properties of radiation diverting objects.

The model comprises placement characteristic, such as locations, of objects with radiation impact, which may include beacons, other fixed location electric devices, radiation diverting objects, and other objects considered relevant for the model. Optionally the model also comprises locations of fixed objects which may limit movement through the space such as walls or closets. Examples of radiation diverting objects, i.e. objects that may divert various spectra of radiation, which may be present in the monitored space include glass windows, metal bars, metal furniture, electric devices, insulating tiles on the floor, ceiling, walls and the like.

Optionally, one or more additional mobile wireless device may be used for the mapping. The additional mobile wireless devices may take additional images, video clips, and/or the like and may also communicate with beacons and/or the mobile wireless device and measure signal characteristics.

Optionally, mobile wireless devices may have additional wireless transceivers, which may be used to measure changes in signal characteristics such as strength and phase due to location or angular alignment changes.

The mobile wireless device, and optionally the additional The mobile wireless devices may transmit the images it acquired in the monitored space, optionally with readings about the location and viewing direction of the device to a system, used for extracting or estimating placement characteristic of objects with radiation impact, properties of radiation diverting objects in the monitored space and the like. The system may further estimate or fine tune the location data of one or more of the beacons. Various algorithms may be used to convert the image data to properties of radiation diverting objects.

The system may analyze the location certificate(s) received from the respective mobile wireless device to extract the device ID and the transceiver ID included in each location certificate. Optionally, in case one or more of the location certificates are encrypted, the verification unit having access to the cryptographic key(s) used by the wireless transceiver(s) may first decrypt the location certificate(s) in order to analyze it.

Optionally, the system may have information the predefined locations of the wireless transceivers in the monitored space, specifically the location of each wireless transceiver in association with its unique transceiver ID. The system may therefore map each wireless transceiver in the monitored space according to its transceiver ID.

The system may use the information received from the mobile wireless devices to calculate or calibrate the location of each wireless transceiver in association with its unique transceiver ID. The information may comprise visual information from the devices, and/or characteristics of signals received by the transceivers.

The mapping generated by the system may be used by one or more verification units having wireless connectivity via one or more of the wireless communication channels may be deployed at one or more checkpoint in the monitored space. For example, when arriving at one of the checkpoints, a user mobile wireless device may receive location certificates, based on estimations considering objects with radiation impact present in the monitored space.

Verification units may apply the map to validate, authenticate and/or otherwise verify one or more users associated with respective mobile wireless devices before allowing the user(s) access one or more restricted areas and/or resources, for example, a restricted room, a restricted terminal and/or the like. In particular, the user(s) may be verified based on verification of their estimated path through the monitored space which is computed based on the mapping. In such exemplary applications, the wireless transceivers may be deployed at passage location typically passed by users traveling in the monitored space, for example, entrances, exits, doors, elevators, escalators, split locations (e.g., intersecting corridors, etc.) and/or the like. Moreover, the transmission range of the wireless transceivers may be set to form a wireless transmission space around each wireless transceiver that may be crossed by the users traveling in the monitored space. Furthermore, the verification unit(s) may be deployed at one or more checkpoints or access points to the restricted area(s) and/or resources, for example, at an entrance to a restricted area, next to a restricted terminal, in association with a network access point and/or the like. The verification unit(s) may verify (validate, authenticate) a certain user by comparing its estimated path to one or more approved paths. In case the estimated path complies, optionally with some acceptable deviation, with the approved path(s), the verification unit may determine that the estimated path is a valid and/or legitimate path and the associated user may be granted access to the restricted area and/or resource. However, in case the estimated path significantly deviates from the approved path(s), or the paths the user normally takes, the verification unit may determine that the estimated path is suspicious which may be indicative that the associated user may be potentially malicious and is thus denied access to the restricted area and/or resource.

In another exemplary application, the path verification may be applied to verify a path of one or more disinfection apparatuses associated with respective mobile wireless devices compared to one or more predefined, or approved paths.

Verifying the path of mobile wireless devices in a monitored space based on wireless mapping collected and carried by the mobile wireless devices may present major benefits and advantages compared to existing methods for tracking and verifying paths of mobile wireless devices, due to increased precision compared to satellite based positioning such GPS readings, lesser dependence on wireless network connectivity, transmission ranges, and options to integrate with security protocols.

A map may be created manually, however this method may be prone to errors and require significant effort. A map may also be generated by naïve tracking of the beacons disregarding the effects of radiation diverting objects, however ignoring such objects may also have a major impact on the precision of the locations and path verification. Therefore using visual information to augment the model according to radiation diverting objects may have a significant contribution to the model precision and reliability.

Before explaining at least one embodiment of the invention in detail, it is to be understood that the invention is not necessarily limited in its application to the details of instructions and the arrangement of the components and/or methods set forth in the following description and/or illustrated in the drawings and/or the Examples. The invention is capable of other embodiments or of being practiced or carried out in various ways.

Figure 1:
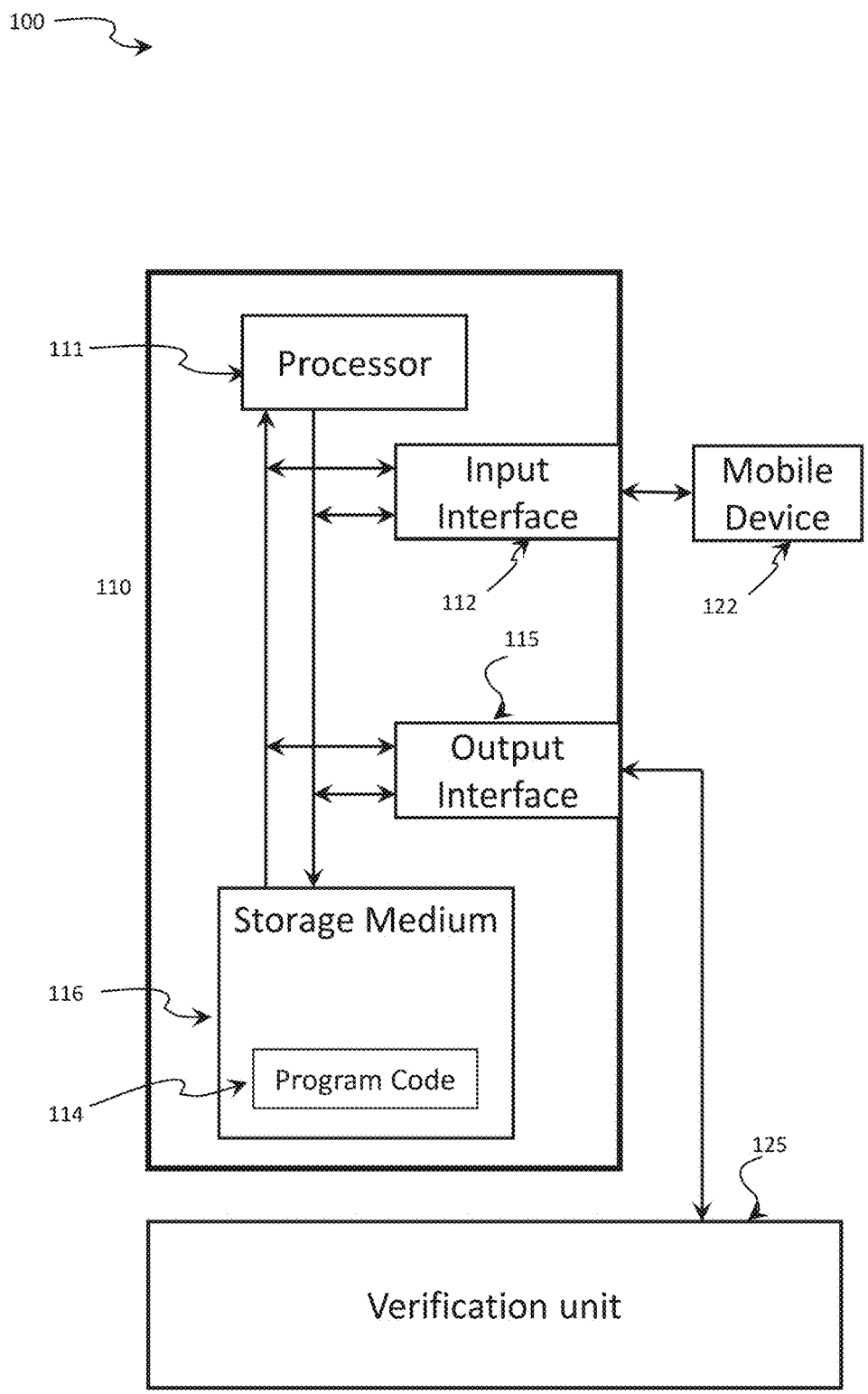
FIG. 1 is a is a schematic illustration of an exemplary system for generating a model, mapping a monitored space based images recorded by the mobile wireless device, according to some embodiments of the present invention.
Figure 2:
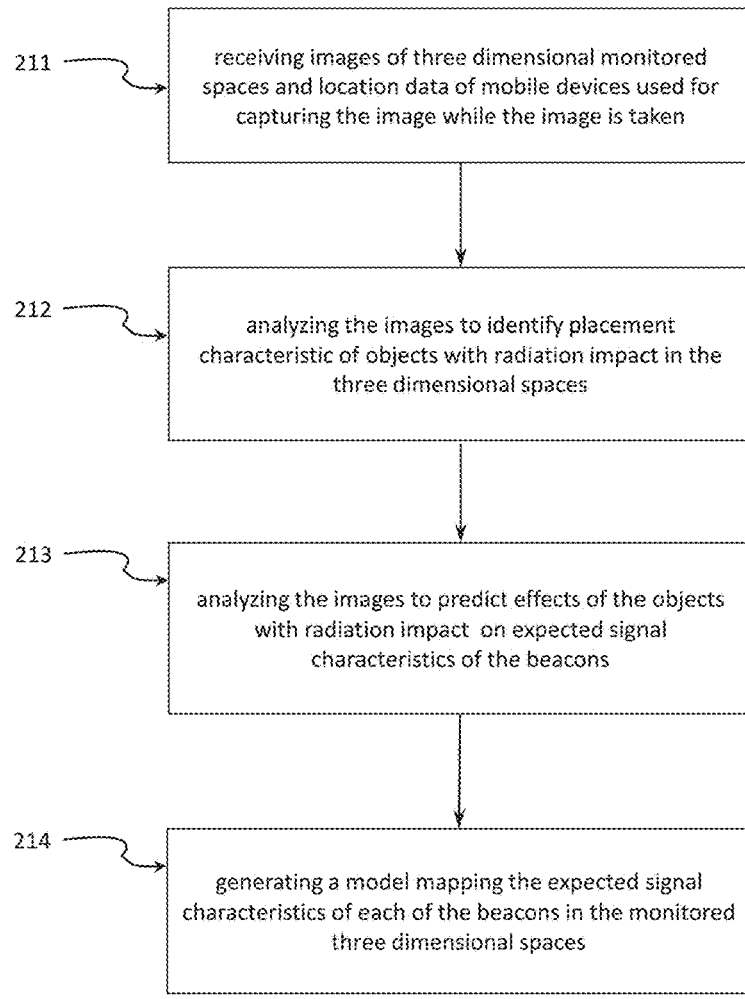
FIG. 2 is a flowchart of an exemplary process of generating a model, mapping a monitored space based on images recorded by the mobile wireless device, according to some embodiments of the present invention.

Referring now to the drawings, FIG. 1 is a schematic illustration of an exemplary system for generating a model, mapping a monitored space based images recorded by the mobile wireless device, according to some embodiments of the present invention. The system may be referred to as the mapping system, or the system. An exemplary mapping system 100 may execute processes such as 200 for generating or augmenting a mapping of a monitored space, comprising objects with radiation impact, e.g. beacons and radiation diverting objects. Further details about these exemplary processes follow as FIG. 2 is described.

The exemplary mapping system 110 may include an input interface 112, an output interface 115, one or more processors 111 for executing processes such as 200, and storage 116 for storing code (program code storage 114) and/or data. The mapping system may be physically located on a site, implemented as distributed system, implemented virtually on a cloud service, on machines also used for other functions, on mobile devices such as laptops or smartphones equipped with powerful processing devices, and/or by combination of several options. Alternatively, the system, or parts thereof, may be implemented on dedicated hardware, FPGA and/or the likes. Further alternatively, the system, or parts thereof, may be implemented on a server, a computer farm, and/or the likes.

The input interface 112, and the output interface 115 may comprise one or more wired and/or wireless network interfaces for connecting to one or more networks, for example, a local area network (LAN), a wide area network (WAN), a metropolitan area network (MAN), a cellular network, the internet and/or the like. The input interface 112, and the output interface 115 may further include one or more wired and/or wireless interconnection interfaces, for example, a universal serial bus (USB) interface, a serial port, and/or the like. Furthermore, the output interface 115 may include one or more wireless interfaces for transmitting information to mobile wireless devices, and the input interface 112, may include one or more wireless interfaces for receiving information from one or more devices. Additionally, the input interface 112 may include specific means for communication with one or more mobile, or other devices such as a camera, microphone, cellphone, tablet, a custom made device, and/or the like. And similarly, the output interface 115 may include specific means for communication with one or more display devices 125 such as an automatic door, electric lock, alarm system, light beacon, loudspeaker, display and/or the like.

The one or more processors 111, homogenous or heterogeneous, may include one or more processing nodes arranged for parallel processing, as clusters and/or as one or more multi core one or more processors. Since three dimensional modeling and interpretation of images using computer vision such as detection, panoramic stitching with many degrees of freedom, and the like, the processors may comprise digital signal processing (DSP) processors, graphic processing units (GPU), tensor processing units (TPU) and/or the like. The storage 116 may include one or more non-transitory persistent storage devices, for example, a hard drive, a Flash array and/or the like. The storage 116 may also include one or more volatile devices, for example, a random access memory (RAM) component and/or the like. The storage 116 may further include one or more network storage resources, for example, a storage server, a network attached storage (NAS), a network drive, and/or the like accessible via one or more networks through the input interface 112, and the output interface 115.

The one or more processors 111, homogenous or heterogeneous, may include one or more processing nodes arranged for parallel processing, as clusters and/or as one or more multi core one or more processors. The storage 116 may include one or more non-transitory persistent storage devices, for example, a hard drive, a Flash array and/or the like. The storage 116 may also include one or more volatile devices, for example, a random access memory (RAM) component and/or the like. The storage 116 may further include one or more network storage resources, for example, a storage server, a network attached storage (NAS), a network drive, and/or the like accessible via one or more networks through the input interface 112, and the output interface 115.

The one or more processors 111 may execute one or more software modules such as, for example, a process, a script, an application, an agent, a utility, a tool, an operating system (OS) and/or the like each comprising a plurality of program instructions stored in a non-transitory medium within the program code 114, which may reside on the storage medium 116. For example, the one or more processors 111 may execute a process, comprising generating a model, mapping a monitored space based on images recorded by the mobile wireless device such as 200 and/or the like. This processor may generate maps in several formats. For examples, walls and objects may be represented as voxels, as coordinates, clouds, and/or the like.

Reference is also made to FIG. 2 which is a flowchart of an exemplary process of generating a model, mapping a monitored space based on images recorded by the mobile wireless device, according to some embodiments of the present invention.

Optionally, the process may be used to augment an existing model, in such cases, specific instructions focusing the image capturing and optionally wireless signal measurements, may be generated automatically, manually, or semi automatically. Augmenting may be required due to modification in the monitored space such as moving furniture, redecoration, and/or the like, or due to areas for which the mapping does not meet requirements such as precision or reliability.

The exemplary process 200 may be executed generating one or more model for tasks, such as access control, security monitoring, tracing cleaning or disinfecting machines, and/or the like. The process 200 may be executed by the one or more processors 111. Alternatively, the process 200 or parts thereof may be executing using a different system, a remote system, an auxiliary system, and/or the like.

The exemplary process 200 starts, as shown in 211, with receiving images of three dimensional monitored spaces and location data of mobile devices used for capturing the image while the image is taken.

The images may comprise RGB images, RGBD images, ultraviolet scans, infrared scans, SAR, and/or the like, and may be at a fixed or a varying resolution.

The images may be received directly or indirectly from a mobile device, which may be a wireless mobile device, through a wireless protocol or using a cable such as USB. Video sequences, or other optical readings may also be taken.

The monitored space may be an office, an airport, a train station, a residential house, an apartment, a corridor, a stadium, a hall, a transportation route, a harbor, a garden, a street, a school, and/or the like.

The location data may be generated by GPS or a similar geolocation system, by triangulation of beacon distance estimation, by analysis of the images, using gyroscope, manually, and by combining several methods.

The exemplary process 200 continues, as shown in 212, with analyzing the images to identify placement characteristic of objects with radiation impact in the three dimensional spaces.

The mapping system may analyze the images using a variety of computer vision algorithms, optionally with manual tagging of key features. For example, object detection and classification algorithms may be used to find and characterize objects with radiation impact such as beacons and radiation diverting objects, and 3D reconstruction algorithms may be used to map and calibrate the 3D location of these objects, and extract the relation locations between them, for example, area of effect of a radiation diverting object on a signal from a given beacon.

The beacons may be fixed wireless devices, attached to walls, ceilings, furniture, light fixtures, decorations, and/or the like, or mobile devices placed at given locations. A beacon may have a unique identification, information about its location, and/or the like, and may transmit this information, periodically or as a response to a request, using a wireless protocol. The beacon may be an RF devices, however infrared, sound waves, and/or the like may also be used. A beacon may be a device used specifically for that purpose, a device providing wireless access to an internal or external communication network, a device connected to an alarm system, and/or the like.

Radiation diverting objects may be mapped in the three dimensional spaces of the monitored area.

Radiation diverting object comprise radiation reflecting object comprise objects having a reflective surface, such as glass and metal cabinets, floor and ceiling tiles, metal pillars, light fixtures, and/or the like.

Radiation diverting object comprise radiation absorbing objects, such as plan pots, aquariums, wooden bookshelves, and/or the like.

Radiation diverting object also comprise objects having a prism effect, diverting radiation, in a manner which may be frequency dependent, objects having lens effect and/or the like, either deliberately or accidently.

Other objects with radiation impact, possible path obstructing objects, and other objects of interest may also be mapped.

The exemplary process 200 continues, as shown in 213, with analyzing the images to predict effects of the objects with radiation impact on expected signal characteristics of the beacons.

Predicting the effects of the objects with radiation impact, comprising beacons and radiation diverting objects, mapped in the three dimensional monitored space may comprise using numeric analysis, iterative approximation, and/or the like to solve the Maxwell equations, or heuristics known to the person skilled in the art.

The analysis of the beacon locations and the effects radiation diverting objects in the monitored space or adjacent thereto, may be used to generate a map of the expected signal characteristics of one, some, or each of the beacons present in the monitored space.

One example of a signal characteristic is the signal's strength. The strength is generally a descending function of the distance from the signal source, however radiation diverting objects may account for variations the rate and sometimes may create an area in which the function is inverted.

Optionally, the mobile device used for measuring signal characteristics, further comprises an additional wireless transceiver. When more than one wireless transceiver is present, expected signal characteristics may comprise the difference between a signal's strength at the first wireless transceiver and the signal's strength at the additional wireless transceiver, or a function associated therewith.

Furthermore the expected signal characteristics may be the difference between a signal's phase at the first wireless transceiver and the signal's phase at the additional wireless transceiver, or a function associated therewith.

Other properties such as changes in the signal shape due to multipath may also be mapped.

And subsequently, as shown in 214, the process 200 may continue by generating a model mapping the expected signal characteristics of each of the beacons in the monitored three dimensional spaces.

generating a model may comprise formulating a method to determine the expected characteristics of a plurality of signal which may be generated by one or more beacons, given the wireless device location in space, and/or vice versa.

The formulating may be based on a single formula, a set of formulae for each room or other subspaces in the monitored space, a nearest neighbor formulation based on a point cloud, a voxel based formulation, the like, or a combination thereof.

One exemplary signal characteristic is the signal's strength, however when one or more additional wireless transceivers or receivers are present on the mobile device, the signal characteristics may comprise difference between a signal's phase at wireless transceiver and the signal's phase at the additional wireless transceiver, as well as signal strength differences.

It should be noted that this is an exemplary processes, and other algorithms and variations apparent to the person skilled in the art are within the scope of the claims.

Figure 3:
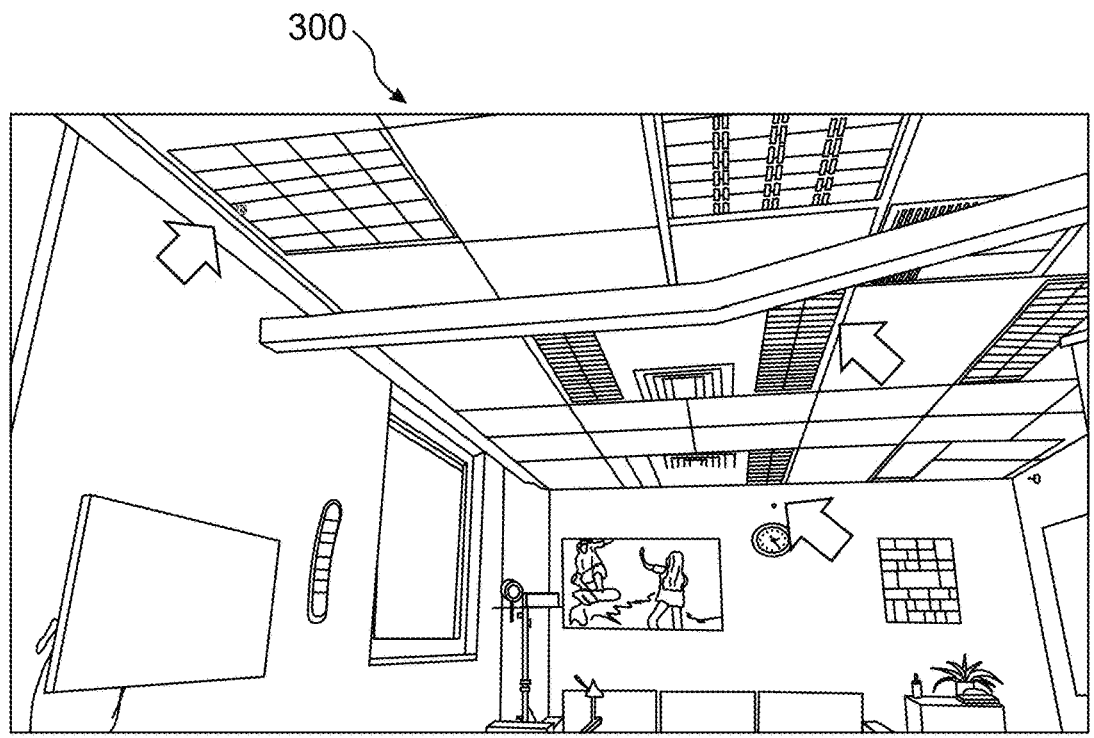
FIG. 3 is an image of an exemplary monitored space, comprising fixed wireless beacons, and three images of enlarged areas therein, according to some embodiments of the present invention.
Figure 3:
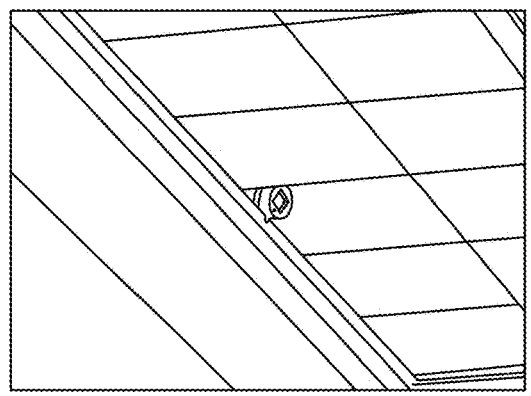
Figure 3:
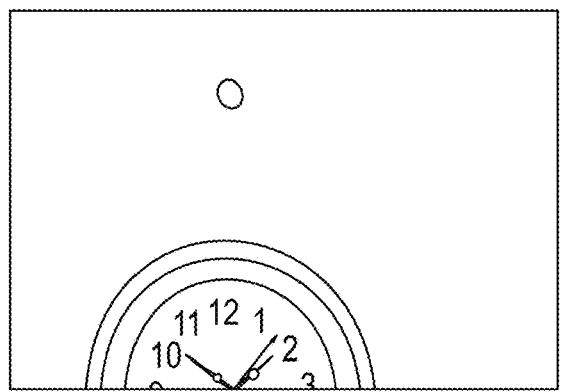
Figure 3:
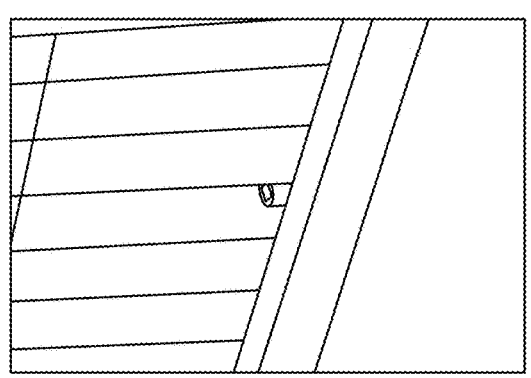

Reference is now made to FIG. 3 which is an image of an exemplary monitored space, comprising fixed wireless beacons, and three images of enlarged areas therein, according to some embodiments of the present invention.

The image shown in 300 is an exemplary image taken by a mobile wireless device in a monitored space. The image comprises three beacons: One beacon placed inside a light fixture at a distance of 4 meters, as shown in 310, another beacon located above a clock at a distance of 8 meters, as shown in 320, and yet another beacon, also placed inside a light fixture, at a distance of 5 meters, as shown in 330. Arrows where added to point to the areas of the sub images 310, 320, and 330.

Detection computer vision algorithms, possibly assisted by wireless readings, may be used to search the image to find beacon candidates. When a beacon candidate is detected, the algorithms may also apply the approximate distance, either by properties of the detected candidate such as size or focus, or by triangulation using a plurality of images. The approximated distance, either by a single image or by a plurality of images, may be validated by correspondence to the distance estimation from the radio frequency (RF) signal received from the beacon by the mobile device used to capture the image.

It should be noted that this is an exemplary image, and other kinds of spaces, beacon locations, numbers, and variations apparent to the person skilled in the art are within the scope of the claims.

Figure 4:
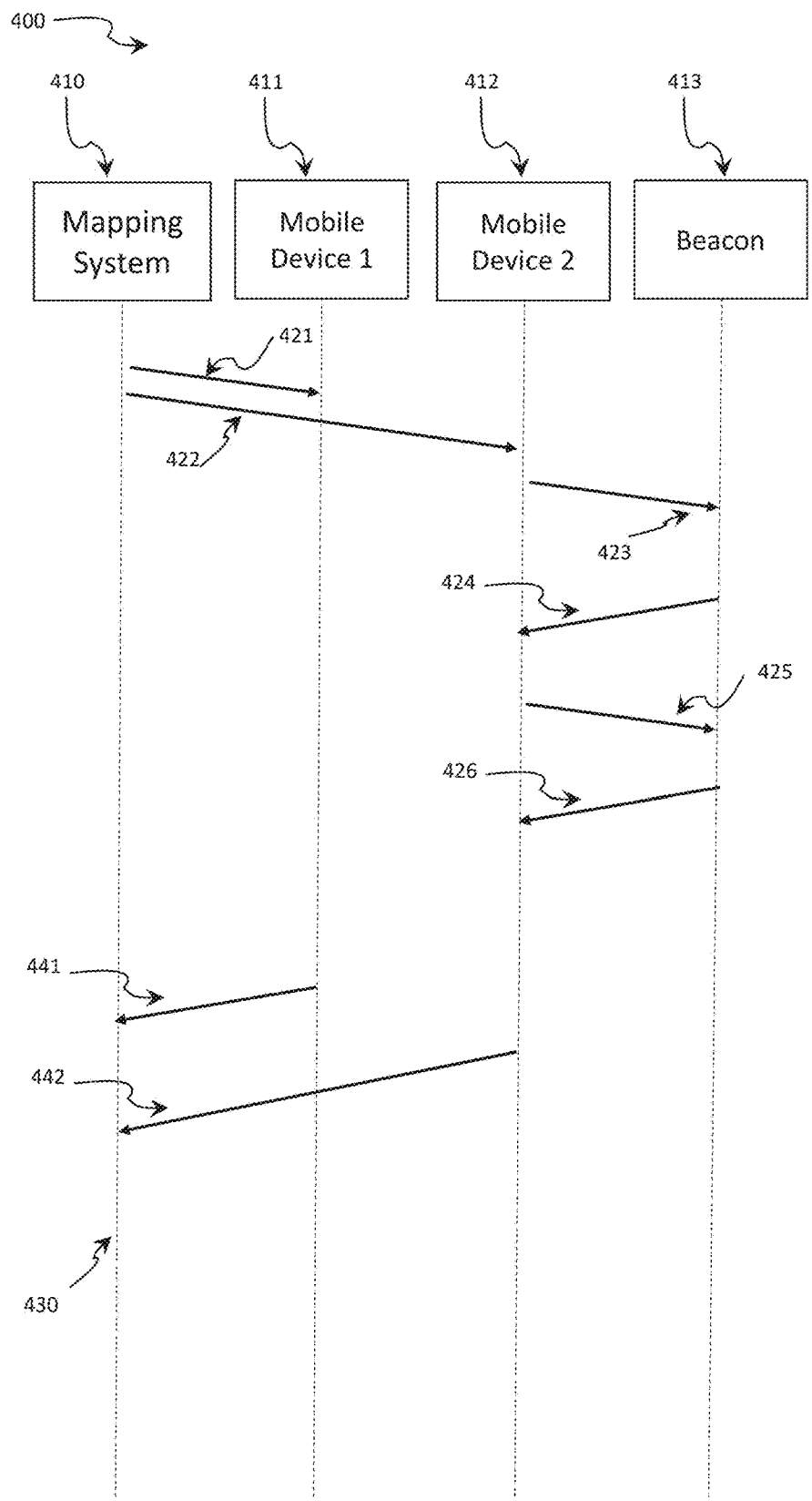
FIG. 4 is a sequence diagram of an exemplary process for generating a model, mapping a monitored space based on images recorded by the mobile wireless device, according to some embodiments of the present invention.

Reference is also made to FIG. 4, which is a sequence diagram of an exemplary process for generating a model, mapping a monitored space based on images recorded by two mobile wireless devices, according to some embodiments of the present invention;

The exemplary sequence diagram 400 exemplifies a sequence of wireless communication sessions associated with an exemplary process of generating or augmenting a model, mapping a monitored space based on images recorded by the two mobile wireless devices. A process such as 200 (shown in FIG. 2), may for example, comprise the wireless communication sessions from 423 to 442. According to some implementations of a process of generating or augmenting a model, mapping a monitored space based on images recorded by two mobile wireless devices, Mobile Device 1 411 and Mobile Device 2 412, which may be connected to the input interface 112 and the output interface 115 (shown in FIG. 1) of the Mapping System 410 using a wireless protocol. One or more of the mobile wireless devices may also be connected to an exemplary Beacon shown in 413. The timeline is depicted for each agent such as the Mapping System as a descending line 430.

The mobile devices capturing images may further comprise a wireless transceiver, for example Mobile Device 2 in this examples has a wireless transceiver, and may comprise an additional wireless transceiver for measuring how signal characteristics may change due to small location and/or alignment changes.

The exemplary sequence 400 may be initiated by the Mapping System transmitting instructions to Mobile Device 1, based on general guidelines for generating the model, on areas of low precision or confidence for augmenting a model, or the like, as shown in 421. These instructions may comprise, for example, a list of locations and directions to take images at, and optionally to perform wireless communication sessions with the exemplary beacon. Similarly, as shown in 422, the Mapping System may transmit instructions to Mobile Device 2.

Followingly, as shown in 423, Mobile Device 2, placed in a given location, for example, a location indicated by the instructions received as shown 422, may transmit a scan signal to the Beacon, and receive an identification response as shown in 424.

Followingly, as shown in 425, Mobile Device 2, optionally placed in a different alignment and/or location, may transmit another request signal to the Beacon, and receive a response as shown in 426. The transmissions may be used to measure signal characteristics, verify the beacon location, analyze effects of radiation diverting objects, and/or other properties of objects with radiation impact, objects which may obstruct movement, and/or the like.

The images and other measurements may be used to find and calibrate placement characteristics and other properties of the beacons, as well as other objects with radiation impact present in the monitored space or adjacent area.

During that time both mobile devices may capture images at various location, directions, and technologies, for example RGBD and infrared may also be used.

Followingly, Mobile Device 1 and Mobile Device 2, may transmit the images and other measurements taken to the Mapping System 410, as shown in 441 and 442 respectively.

It should be noted that this is an exemplary processes, the number of mobile wireless devices is not limited, more than one devices may communicate with beacons, the single exemplary beacon was shown for the sake of simplicity and a plurality of beacons may mapped, and other variations apparent to the person skilled in the art are within the scope of the claims.

Figure 5:
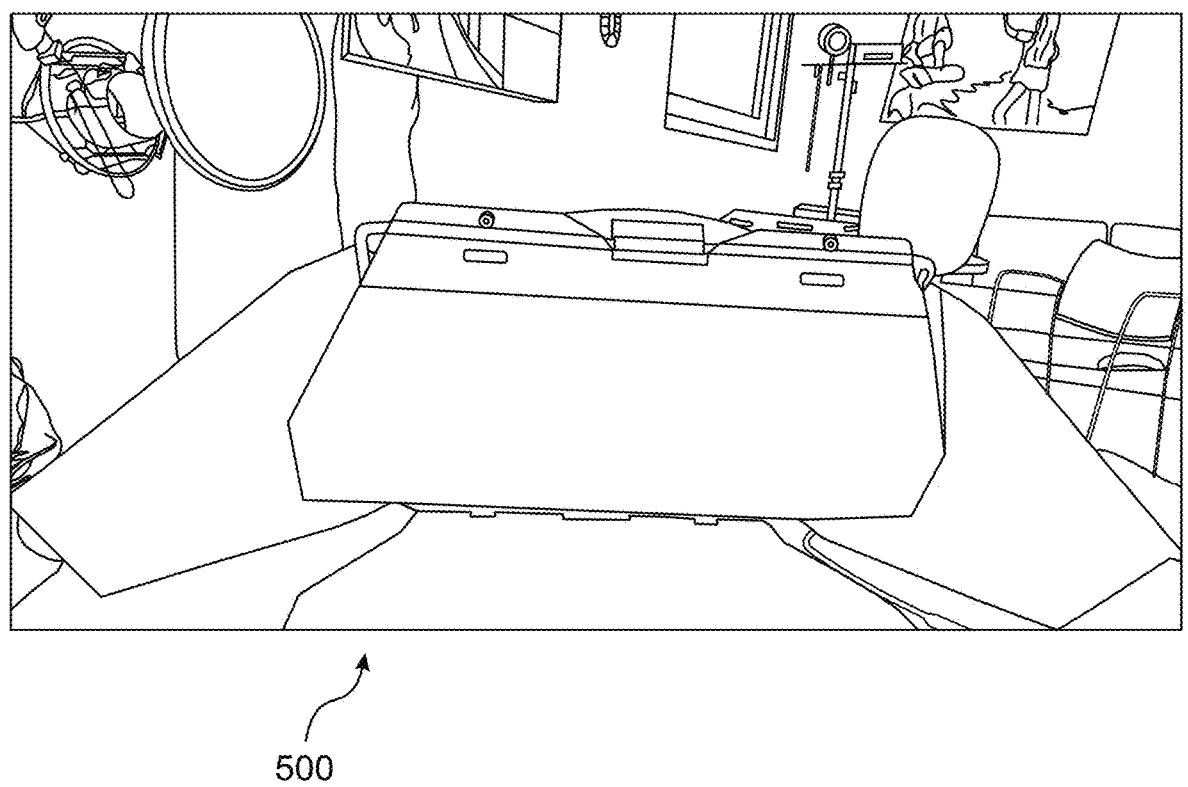
FIG. 5 is an image of an exemplary radiation diverting object in an exemplary monitored space, according to some embodiments of the present invention

Reference is now made to FIG. 5 which is an image of an exemplary radiation diverting object in an exemplary monitored space, according to some embodiments of the present invention.

The image 500 was taken in a room, from the perspective of a mobile wireless device, placed behind an object comprising comparatively large metal sheets, from the perspective of at least one beacon.

It should be noted that the object shown is one example of a radiation diverting object, and radiation diverting object may be of different materials, electromagnetic properties, colors, shapes, and the like.

Figure 6:
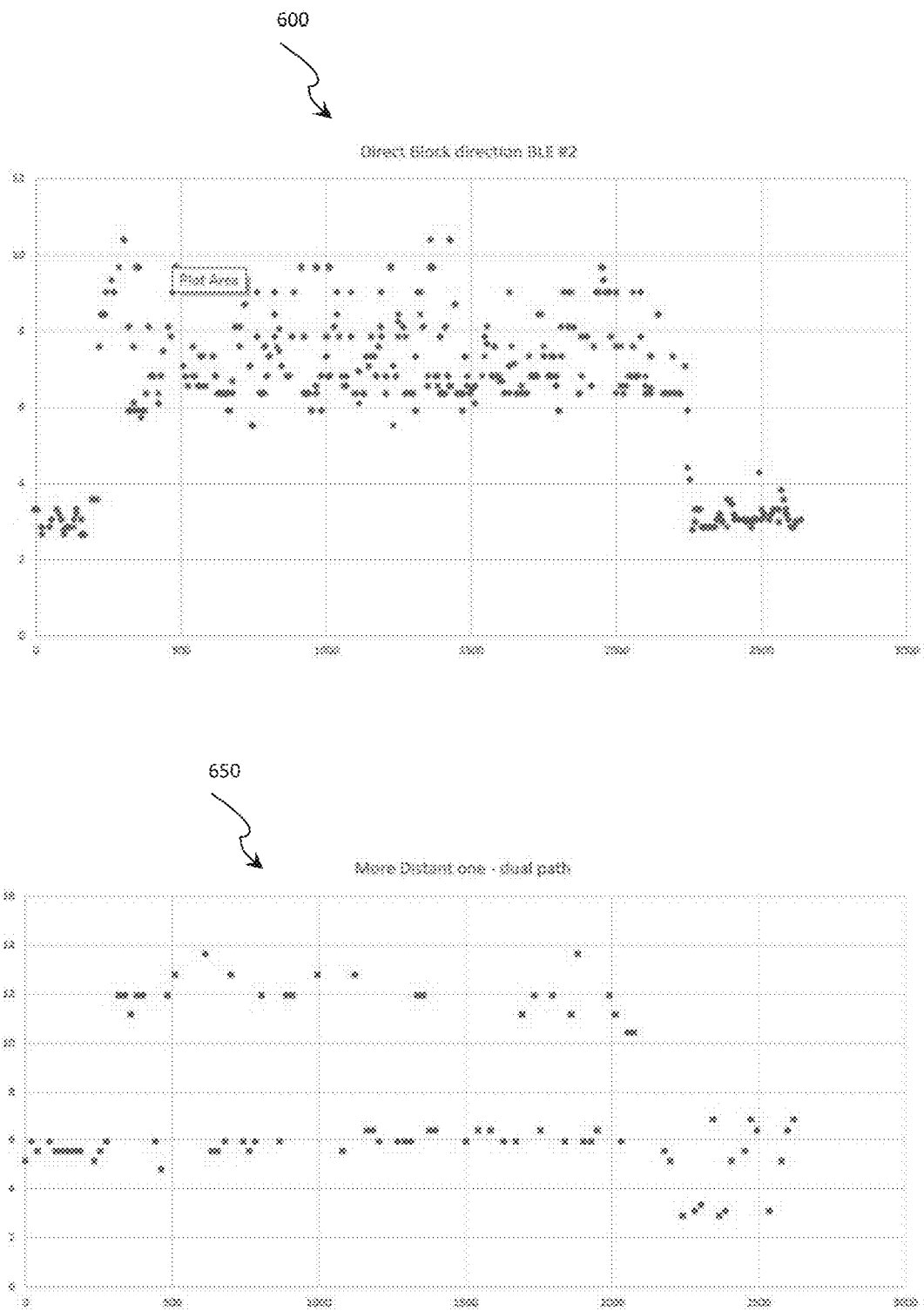
FIG. 6 shows two exemplary plots of estimated distance by time wherein a radiation diverting object was placed near the mobile wireless device, according to some embodiments of the present invention.

Reference is now also made to FIG. 6 which shows two exemplary plots of estimated distance by time wherein a radiation diverting object was placed near the mobile wireless device, according to some embodiments of the present invention.

These exemplary plots depict the multipath characteristics of the signal in the presence of additional objects with radiation impact, for example a radiation diverting object. The plot is depicted for a time period comprising a period when a radiation diverting object was placed directly between the mobile wireless device and the beacon.

The metal blocking of the object with radiation impact is applied in the assumed direction of some beacons, at the time range applied at t=400 to 2100 in seconds in the first example, as shown in 600. The average estimated distance increases as well as the standard deviation. The distance and standard deviation increase due to the blocking indicates a classic multipath situation, in which the signal arrives at the transceivers of the wireless device from various directions being reflected, diverted, and/or the like by various radiation diverting objects such as walls, ceiling tiles, floor tiles, furniture and/or the like. Blocking in this example has not been applied outside the t=400 to 2100 seconds range.

In the second example, as shown in 650, the metal blocking is also applied in the assumed direction of some beacons, at the time range applied at t=400 to 2100 in seconds. The difference is that the distance from the beacon is longer. In this example, some multipath characteristics may also be seen when the metal blocking is not applied, as the secondary paths by which signal arrives reflected or diverted by radiation diverting objects bear more significance even when the direct path is open. This example also shows that the distance increases as well as the standard deviation, indicating a classic multipath situation.

Figure 7A:
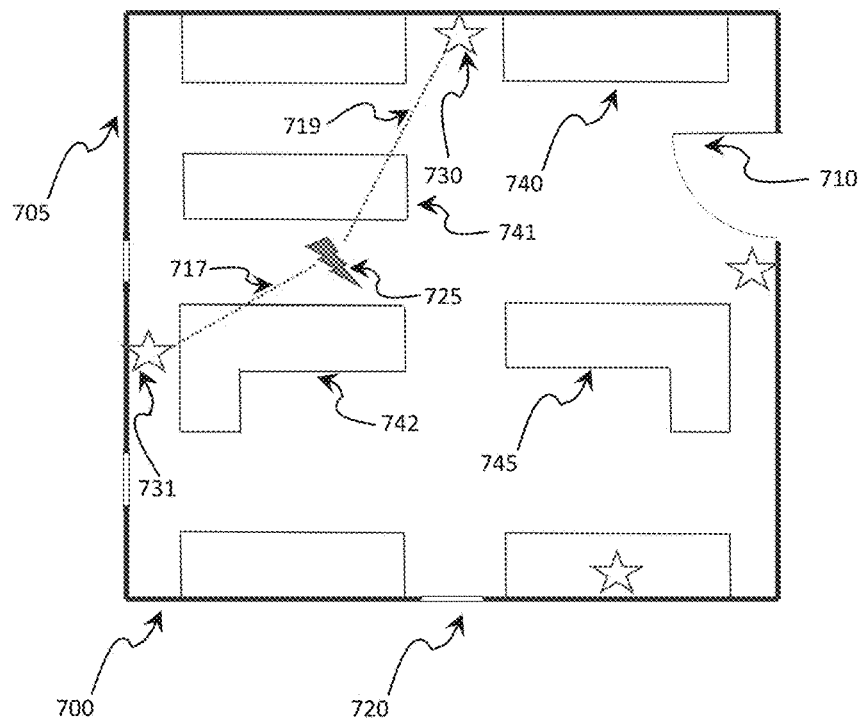
FIG. 7A shows some exemplary aspects of a model mapping exemplary expected signal characteristics over a floorplan of an exemplary monitored space, wherein the plurality of objects with radiation impact comprises beacons, according to some embodiments of the present invention.

Reference is now made to FIG. 7A which shows some exemplary aspects of a model mapping exemplary expected signal characteristics over a floorplan of an exemplary monitored space, according to some embodiments of the present invention.

The exemplary monitored space shown in 700 is an exemplary space which may function as an office, a library, a laboratory, and/or the like, and located within walls shown in 705, having a door shown in 710 and three windows for example 720. The cabinets, for example 740, are placed along the walls, and the tables as shown in 741, 742, and 745 are close to the space center. For the sake of this exemplary model, it is assumed that the radiation effect of floorplan elements such as the walls, windows, tables, and the like is negligible.

The floorplan is shown for clarity, however it should be noted that it is an optional feature of a model, and model may represent floorplan elements such as doors, windows, tables, cabinets, and other facilities differently. Further, a model may not include any representation of floorplan elements.

Four objects with radiation influence, which are beacons, such as 730 and 731 were placed in the monitored space, and a mobile wireless device, optionally carried by a person, is located at 725. The actual distance from the beacon shown in 730 to the mobile wireless device located at 725 is shown in 719, and the actual distance from the beacon shown in 731 to the mobile wireless device located at 725 is shown in 717. The model comprises means of estimating the location of the mobile wireless device, which may be obtained by estimating the distances such as the distances shown in 717 and 719, for example by the signal strength. The distance estimation may comprise distances from additional mobile devices, and when the results don't generate a precise match, means such as averaging, majority vote, weighted averaging, and the like, may be used to estimate the location.

It should also be noted that he model is shown as a two dimensional (2D) model, for the sake of clarity. The model depicted may be a projection of a 3D model over the horizontal plane, and 3D aspects of the monitored space may be modeled. For examples, beacons may be placed in various heights and the device height may also be traced.

The model may be used by a verification unit to enforce security policies, for example, when the table 741 contains sensitive information, the system using the model may verify, optionally using other sensors such as infrared, that no one approaches the table unless at least one person permitted to control access to the sensitive information is present around the table. The system using the model may similarly control the door, and allow opening it only when a permitted person is close enough and able to see who passes through and whether something is stolen from the monitored space. The system using the model may also verify that a person hired to disinfect the monitored space doesn't skip any of the tables 741,742 or 745.

Figure 7B:
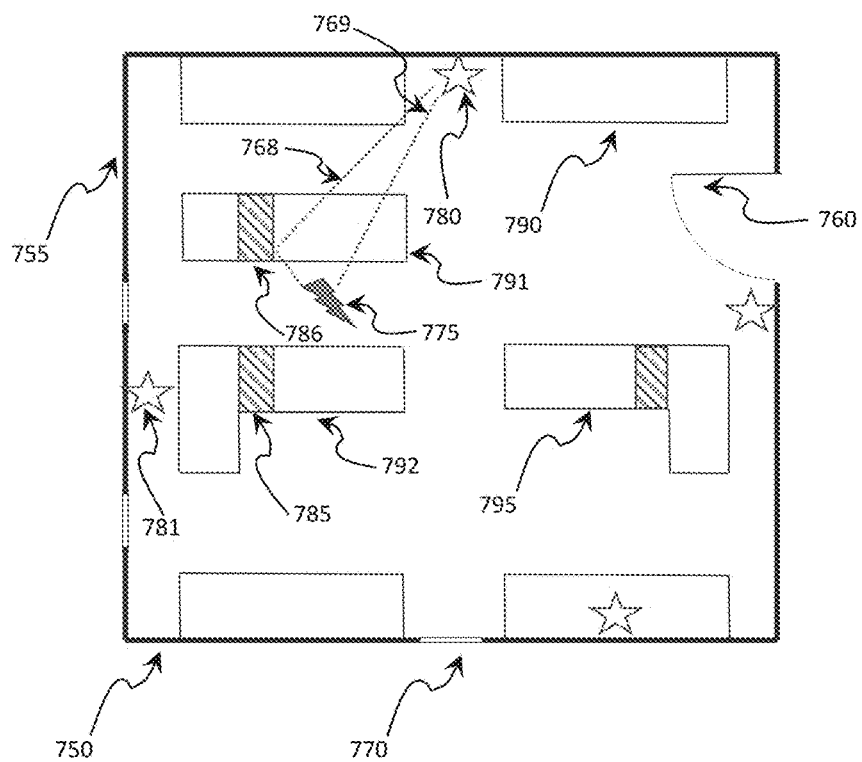
FIG. 7B shows some exemplary aspects of a model mapping exemplary expected signal characteristics over a floorplan of an exemplary monitored space, wherein the plurality of objects with radiation impact comprises beacons and radiation diverting object, according to some embodiments of the present invention.

Reference is now made to FIG. 7B which shows some exemplary aspects of a model mapping exemplary expected signal characteristics over a floorplan of an exemplary monitored space, wherein the plurality of objects with radiation impact comprises beacons and radiation diverting object, according to some embodiments of the present invention.

The exemplary monitored space shown in 750 is an exemplary space which may function as an office, a library, a laboratory, and/or the like, and located within walls shown in 755, having a door shown in 760 and three windows for example 720. The cabinets, for example 790, are placed along the walls, and the tables as shown in 791, 792, and 795 are close to the space center. For the sake of this exemplary model, it is assumed that the radiation effect of floorplan elements such as the walls, windows, tables, and the like is negligible. The floorplan is shown for clarity, and should not be construed as an essential feature of the model.

Four objects with radiation influence, which are beacons, such as 780 and 781 were placed in the monitored space, and a mobile wireless device, optionally carried by a person, is located at 775.

Since an object with radiation influence, which is a radiation diverting object such as a metal cabinet a device having a metal case, or the like, shown in 785 is placed on the table 791, the characteristics of the signal arriving at the mobile wireless device, located at 775, may be altered. There is a direct path from the beacon shown in 780 to the mobile wireless device located at 775 as shown in 769. In additional, there is a path comprising a reflection by the radiation diverting object shown in 786, which is shown in 768. Furthermore, objects with radiation influence, which are radiation diverting objects, may have additional influence on the signal characteristics. For example, the objects with radiation influence shown in 785, may at least partially obstruct the path from the beacon shown in 781 to the mobile wireless device located at 775.

Other beacons may be used to locate or trace the mobile wireless device in the monitored space. Radiation diverting objects may be placed deliberately to mitigate a low confidence area, wherein the location of the wireless mobile device, which may be an employee tag, a cellphone, or the like, is difficult to determine, or the security needs require increased precision.

The model is shown in 2D, for clarity, and the actual model may further represent height related aspects of the locations of the mobile wireless device, and the objects with radiation impact. For example, metal pipes installed beneath the floor or close to the ceiling may also have radiation impact.

Reference is now made to FIG. 8A which shows some exemplary aspects of a model mapping exemplary expected signal characteristics over a floorplan of another exemplary monitored space, wherein the plurality of objects with radiation impact comprises stationary and non-stationary beacons and radiation diverting object, according to some embodiments of the present invention.

In this example, the plurality of beacons comprises stationary beacons shown for example in 821, and non-stationary beacons placed on moveable objects, shown for example in 811 and 831.

The exemplary monitored space shown in 800 is an exemplary space which may function as a parking lot, a logistic center, a warehouse and/or the like, and located within walls shown in 805. Vehicles such as pick-up trucks, trucks, trailer cabins, station wagons, cars, and/or the like, as shown for example in 810 may be present on the space. A beacon, as shown in 811, may be present on the vehicle, for example in the vehicle trunk. One or more beacons, as shown for example in 821, may be present in the monitored space. The monitored space may be used for loading and unloading packages, crates, and the like on and/or off the vehicles.

Crates as shown for example in 830 and 832 may be situated on the floor, a shelf, or above other crates, stored for various terms, until they are loaded on a designated vehicle. One, some, or all of the crates may be labelled by a beacon, as shown in 831. The beacons labeling crates, packages, envelopes, and/or the like may be periodically charged, for example wirelessly, however some beacons may be configured to emit their signal infrequently, or on a limited range, such as 0.5, 1 or 2 meters, due to power battery limitations. For example, the device shown in 840 may indicate a distance of 1.5 meters from the label bacon shown in 831, attached to the crate shown in 832. Furthermore, the distance to the beacon shown in 821, which may be attached to the wall, may be 5 meters, and while the distance to the beacon shown in 811, which is placed inside the truck shown in 810, may appear over 5 meters due to the radiation influence of the truck trunk's wall.

A mobile device, which may be operated by an inspector, who may be human or robotic, is shown in 840, and may be used for real time augmenting of the model. Distance estimation to stationary or mobile objects with radiation influence such as beacons may comprise distances from additional mobile devices, and when the results don't generate a precise match, means such as averaging, majority vote, weighted averaging, and the like, may be used to estimate the location.

Parts of the vehicles, for example doors, wall, motors, and the like may be objects with radiation influence. Additionally, some storage facilities such as metal cabinets, shelves, walls, packaging materials, and the like, may have radiation influence and be represented in the model. Modeling the influence of these objects with radiation influence may improve the effectiveness of using beacons which are weak radio frequency (RF) labels, potentially using a mobile device, to ensure a package, a crate, and/or the like is placed in the designated location, within a storage space, or a vehicle, saving time, space and energy.

The model may be used by a verification unit to instruct porters, robotic porters, forklift operators, automatic, robotic forklifts, levers, and/or the like to move the package from places in the monitored space to other places, including, but not limited to storage facilities and vehicle trunks.

The floorplan is shown for clarity, however it should be noted that it is an optional feature of a model, and model may represent floorplan elements such as doors, windows, tables, cabinets, shelves, vehicles, and other elements differently. Further, a model may not include any representation of floorplan elements.

Reference is now made to FIG. 8B which shows some exemplary aspects of a model mapping exemplary expected signal characteristics over a floorplan of another exemplary monitored space, wherein the plurality of objects with radiation impact comprises beacons and radiation diverting object, according to some embodiments of the present invention.

In this example, the plurality of beacons comprises also stationary beacons shown for example in 871, and non-stationary beacons placed on moveable objects, shown for example in 861 and 881.

The exemplary monitored space shown in 850 is an exemplary space which may be used for parking, storage, logistics and/or the like, having walls shown in 855. Vehicles, as shown for example in 860 may be present on the space. A beacon, as shown in 861 and 862, may be placed on the vehicle, for example in the vehicle trunk. One or more beacons, as shown for example in 871, may be located in the monitored space, which may be used for loading and unloading packages, crates, and the like on and/or off the vehicles.

Crates as shown for example in 880 may be located on the floor, a shelf, or above other crates, until they are loaded on a designated vehicle, as for example shown in 882. One, some, or all of the crates may be labelled by a beacon, as shown in 881. The beacons labeling crates, packages, envelopes, and/or the like may be battery operated, periodically or real time charged.

A mobile device, which may be operated by an inspector, human or robotic, is shown in 890, and may be used for real time augmenting of the model.

For example, the device shown in 890 may indicate a distance of 1.2 meters from the label bacon shown in 881, attached to the crate shown in 882, when the back door of the truck shown in 869 is open, and a larger distance when it is closed. Furthermore, the distance to the beacon shown in 871, which may be attached to the wall, may be 5 meters, and while the distance to the beacon shown in 861, which is placed inside the truck shown in 860, may appear over 5 meters due to the radiation influence of the truck trunk's wall, or back door when it is closed. For example, the signal strength may match a distance of 8 meters. The distance to the beacon shown in 862 is expected to appear larger. Additionally, the beacon shown in 861 may have independent means to communicate with the system using the model to indicate whether the crate shown in 882, and having the label beacon shown on 881 is within the range, which may be limited to 1, 3 or 6 meters, and thus likely to be inside the truck shown in 860.

The verification unit applying the model may help ensure correct shipment, by validating the package having the right label was loaded on, or unloaded from the right vehicle. For example, the space shown in 850 may be the same space shown in 800 after a package was loaded on the truck.

The model may be used to enforce security policies, for example, the system may sound an alarm if someone unauthorized to drive enters the truck cabin. The system using the model may similarly control doors of vehicles and/or storage facilities, and allow opening it only when a permitted person is close enough and able to see who passes through and whether something is stolen from the monitored space.

It should also be noted that he model is shown as a two dimensional (2D) top view model, for the sake of clarity. The model depicted may be a projection of a 3D model over the horizontal plane, and 3D aspects of the monitored space may be modeled. For examples, the crates may be placed on shelves or stacked on one another and the space may use beacons also to estimate the elevation of the crate.

It is expected that during the life of a patent maturing from this application many relevant transmission methods, imaging technologies, computer vision, 3D reconstruction, and spatial analysis algorithms will be developed and the scope of the terms image, transmit, receive, analyze and the like is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a device" or "at least one device" may include a plurality of devices, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating and augmenting a model, comprising:
    receiving at least one image of a three dimensional space and a location data of a mobile device used for capturing the image while the image is taken;
    analyzing the at least one image to identify at least one placement characteristic of at least one of a plurality of objects with radiation impact in the three dimensional space;
    analyzing the at least one image to predict an effect of at least one of the plurality of objects with radiation impact on a plurality of expected signal characteristics in at least one location in the monitored three dimensional space; and
    generating a model mapping the plurality of expected signal characteristics of at least one beacon in the monitored three dimensional space;
    wherein the model is associated with a verifying a user path through the monitored space.

2. The computer implemented method of claim 1, wherein at least one of the plurality of expected signal characteristics is associated with a signal's strength.

3. The computer implemented method of claim 1, wherein the mobile device further comprising a wireless transceiver.

4. The computer implemented method of claim 3, wherein the mobile device further comprising an additional wireless transceiver, and at least one of the plurality of expected signal characteristics is associated with the difference between a signal's phase at the wireless transceiver and the signal's phase at the additional wireless transceiver.

5. The computer implemented method of claim 1, wherein the plurality of objects with radiation impact comprises at least one radiation diverting object.

6. The computer implemented method of claim 5, wherein the at least one radiation diverting object comprises a reflective surface.

7. The computer implemented method of claim 5, wherein the at least one radiation diverting object comprises a radiation absorbing object.

8. The computer implemented method of claim 5, wherein the effect of the at least one of the plurality of objects with radiation impact is an effect of the at least one radiation diverting object on a plurality of expected signal characteristics of the at least one beacon.

9. A computer implemented method of generating and augmenting a model, comprising:
    receiving at least one image of a three dimensional space and a location data of a mobile device used for capturing the image while the image is taken;
    analyzing the at least one image to identify at least one placement characteristic of at least one of a plurality of objects with radiation impact in the three dimensional space;
    analyzing the at least one image to predict an effect of at least one of the plurality of objects with radiation impact on a plurality of expected signal characteristics in at least one location in the monitored three dimensional space; and
    generating a model mapping the plurality of expected signal characteristics of at least one beacon in the monitored three dimensional space;
    wherein the mobile device further comprising a wireless transceiver;
    wherein the mobile device further comprising an additional wireless transceiver, and at least one of the plurality of expected signal characteristics is associated with the difference between a signal's strength at the wireless transceiver and the signal's strength at the additional wireless transceiver.

10. A computer implemented method of generating and augmenting a model, comprising:
    receiving at least one image of a three dimensional space and a location data of a mobile device used for capturing the image while the image is taken;
    analyzing the at least one image to identify at least one placement characteristic of at least one of a plurality of objects with radiation impact in the three dimensional space;
    analyzing the at least one image to predict an effect of at least one of the plurality of objects with radiation impact on a plurality of expected signal characteristics in at least one location in the monitored three dimensional space; and
    generating a model mapping the plurality of expected signal characteristics of at least one beacon in the monitored three dimensional space;
    wherein the plurality of objects with radiation impact comprises a plurality of beacons.

11. The computer implemented method of claim 10, wherein at least one beacon of the plurality of beacons is placed on a moveable object.

12. A system for generating and augmenting a model, comprising:
    a mobile device used for capturing at least one image of a three dimensional space and a location data of the mobile device while the at least one image is taken; and
    a computing system configured for:
        receiving the at least one image from the mobile device;
        analyzing the at least one image to identify at least one placement characteristic of at least one of a plurality of objects with radiation impact in the three dimensional space;
        analyzing the at least one image to predict an effect of at least one of the plurality of objects with radiation impact on a plurality of expected signal characteristics in at least one location in the monitored three dimensional space; and
    generating a model mapping the plurality of expected signal characteristics of at least one beacon in the monitored three dimensional space;
    wherein the model is associated with a verifying a user path through the monitored space.

13. The system of claim 12, wherein at least one of the plurality of expected signal characteristics is associated with a signal's strength.

14. The system of claim 12, wherein the mobile device further comprising a wireless transceiver.

15. The system of claim 12, wherein the plurality of objects with radiation impact comprises at least one radiation diverting object.

16. The system of claim 15, wherein the at least one radiation diverting object comprises a reflective surface.

17. The system of claim 15, wherein the at least one radiation diverting object comprises a radiation absorbing object.

18. The system of claim 15, wherein the effect of the at least one of the plurality of objects with radiation impact is an effect of the at least one radiation diverting object on a plurality of expected signal characteristics of the at least one beacon.

19. A system for generating and augmenting a model, comprising:
- a mobile device used for capturing at least one image of a three dimensional space and a location data of the mobile device while the at least one image is taken; and
- a computing system configured for:
  - receiving the at least one image from the mobile device;
    - analyzing the at least one image to identify at least one placement characteristic of at least one of a plurality of objects with radiation impact in the three dimensional space;
    - analyzing the at least one image to predict an effect of at least one of the plurality of objects with radiation impact on a plurality of expected signal characteristics in at least one location in the monitored three dimensional space; and
  - generating a model mapping the plurality of expected signal characteristics of at least one beacon in the monitored three dimensional space;
- wherein the mobile device further comprising a wireless transceiver;
- wherein the mobile device further comprising an additional wireless transceiver, and at least one of the plurality of expected signal characteristics is associated with the difference between a signal's strength at the wireless transceiver and the signal's strength at the additional wireless transceiver.

20. A system for generating and augmenting a model, comprising:
- a mobile device used for capturing at least one image of a three dimensional space and a location data of the mobile device while the at least one image is taken; and
- a computing system configured for:
  - receiving the at least one image from the mobile device;
    - analyzing the at least one image to identify at least one placement characteristic of at least one of a plurality of objects with radiation impact in the three dimensional space;
    - analyzing the at least one image to predict an effect of at least one of the plurality of objects with radiation impact on a plurality of expected signal characteristics in at least one location in the monitored three dimensional space; and
  - generating a model mapping the plurality of expected signal characteristics of at least one beacon in the monitored three dimensional space;
- wherein the mobile device further comprising a wireless transceiver;
- wherein the mobile device further comprising an additional wireless transceiver, and at least one of the plurality of expected signal characteristics is associated with the difference between a signal's phase at the wireless transceiver and the signal's phase at the additional wireless transceiver.

21. A system for generating and augmenting a model, comprising:
- a mobile device used for capturing at least one image of a three dimensional space and a location data of the mobile device while the at least one image is taken; and
- a computing system configured for:
  - receiving the at least one image from the mobile device;
    - analyzing the at least one image to identify at least one placement characteristic of at least one of a plurality of objects with radiation impact in the three dimensional space;
    - analyzing the at least one image to predict an effect of at least one of the plurality of objects with radiation impact on a plurality of expected signal characteristics in at least one location in the monitored three dimensional space; and
  - generating a model mapping the plurality of expected signal characteristics of at least one beacon in the monitored three dimensional space;
- wherein the plurality of objects with radiation impact comprises a plurality of beacons.

22. The system of claim 21, wherein at least one beacon of the plurality of beacons is placed on a moveable object.

* * * * *